Figure 1:
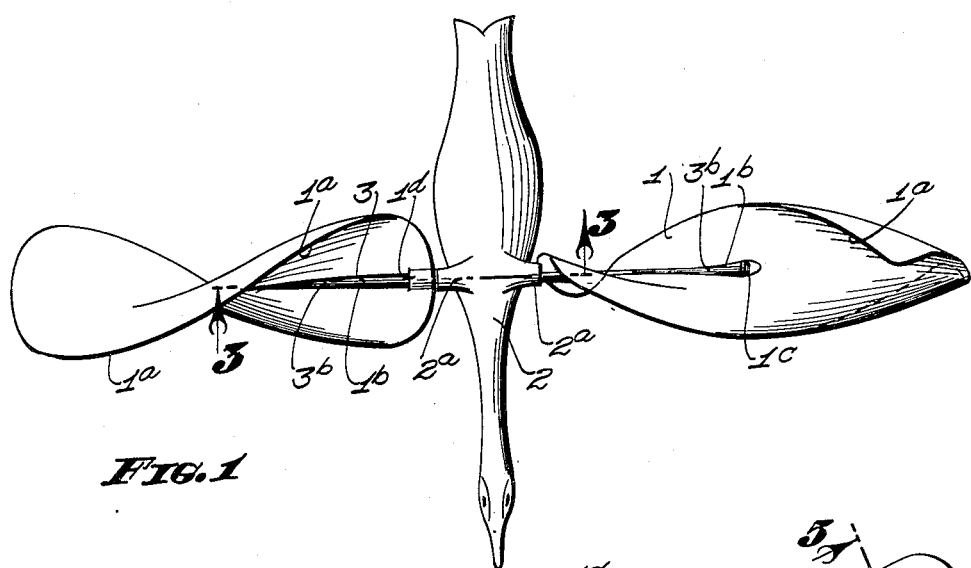

Oct. 2, 1934. F. W. McINTYRE 1,975,116
AIRCRAFT
Filed March 9, 1931 3 Sheets-Sheet 1

INVENTOR
FRANK W. McINTYRE
BY A. B. Bowman
ATTORNEY

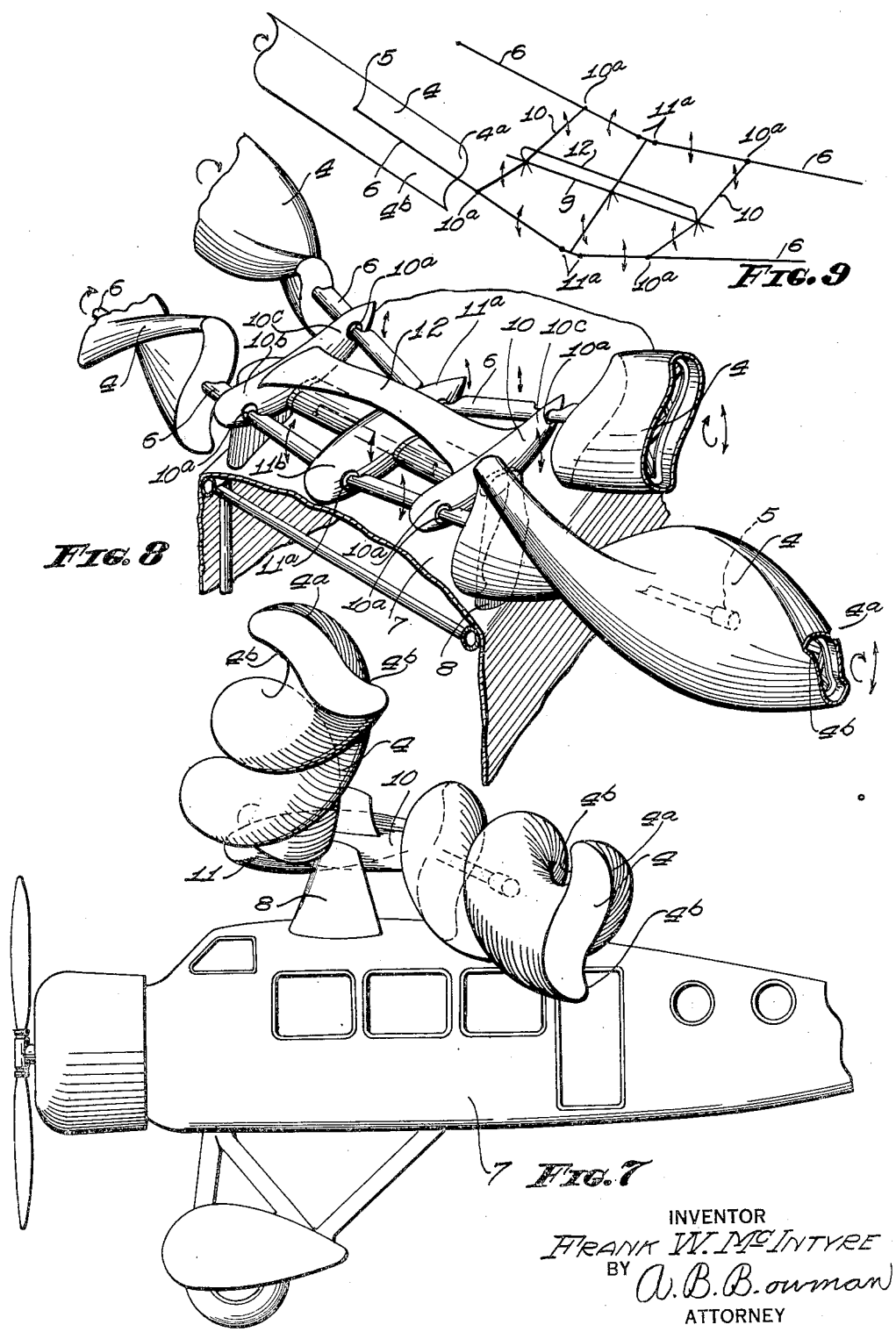

Patented Oct. 2, 1934

1,975,116

UNITED STATES PATENT OFFICE 1,975,116

AIRCRAFT

Frank W. McIntyre, Ocean Beach, Calif.

Application March 9, 1931, Serial No. 521,129

11 Claims. (Cl. 244—14)

My invention relates to aircraft and the objects of my invention are:

First, to provide an aircraft having a sustaining means in which the lifting action per unit area is considerably greater than it is possible to obtain by means of a conventional airfoil thus facilitating the construction of a compact aircraft;

Second, to provide an aircraft having a sustaining means which in addition to having a powerful lifting action has a particularly low drag coefficient, whereby the power needed to move the aircraft through the air is reduced to a minimum;

Third, to provide an aircraft of this class in which the sustaining means revolves either by the action of the air stream thereupon or which may be driven by motors carried by the aircraft, thus providing a sustaining means which may function wholly as a sustaining means or which may exert a propulsive force.

Fourth, to provide an aircraft of this class in which the sustaining means may be readily arranged in tandem, so that a number of sustaining means may be provided along the fuselage of the aircraft, thereby materially reducing the span required in order to obtain sufficient lifting action.

Fifth, to provide an aircraft of this class having a connecting mechanism between a plurality of sustaining units which causes the lifting action of the several units to automatically equalize thereby providing an aircraft which has inherent stability although easy maneuvered.

Sixth, to provide a novel connecting mechanism for a sustaining means of an aircraft which reduces to a minimum or eliminates the detrimental effect of the slip stream from the forward sustaining means upon the rearwardly disposed sustaining means, thus enabling the sustaining means to be arranged in tandem;

Seventh, to provide a sustaining means for an aircraft having a constant angle of attack and hence having a fixed center of lift regardless of the position of the fuselage with respect to the air stream, thus providing an aircraft which is inherently safe in that it is particularly free from the dangers incident to stalling.

Eighth, to provide an aircraft of this class which may be constructed in a simple, elementary form particularly suited for use as a flying toy.

Ninth, to provide an aircraft of this class which, when constructed in its elementary form and used as a toy, may be readily constructed in the form of a bird or the like in such a manner that the sustaining means resembles the wings of a bird as they appear when in flight, so that the toy is educational as well as amusing; and Tenth, to provide on the whole a novelly constructed aircraft which is extremely simple of construction proportional to its functions, sturdy, efficient in its action and which will not readily deteriorate or get out of order.

Figures 2, 3, 5:
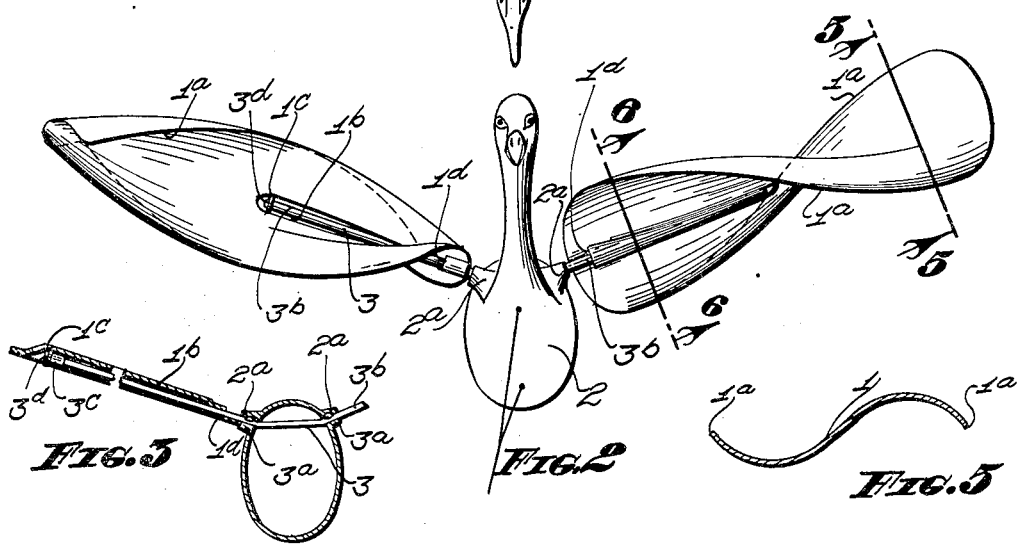
Figures 4, 6:
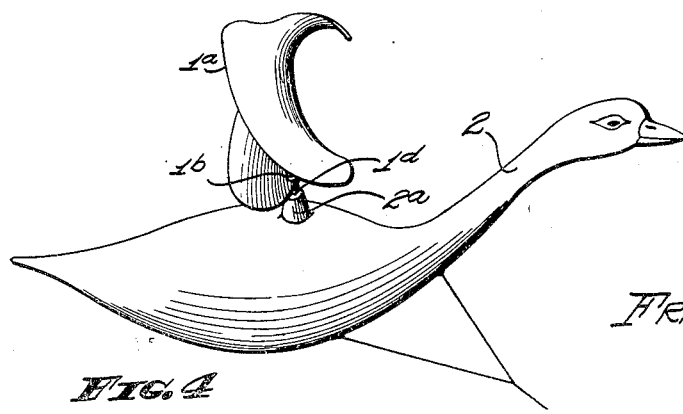

With these and other objects in view, as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figures 1 to 6 inclusive illustrate the more elementary form of my aircraft as it may be applied to the construction of a toy, in which Fig. 1 is a plan view; Fig. 2 is a front elevational view; Fig. 3 is a fragmentary sectional view through 3—3 of Fig. 1; Fig. 4 is a side elevational view; Fig. 5 is a transverse sectional view through one of the wings or sustaining means taken through 5—5 of Fig. 2; and Fig. 6 is another transverse sectional view taken through 6—6 of Fig. 2.

The construction shown in Figs. 7, 8, and 9 inclusive illustrates a more advance form of my aircraft suited for full size commercial aircrafts, in which Fig. 7 is a fragmentary side elevational view; Fig. 8 is a fragmentary perspective view thereof illustrating particularly the connecting mechanism; and Fig. 9 is a diagrammatical view of the connecting mechanism.

Figure 10:
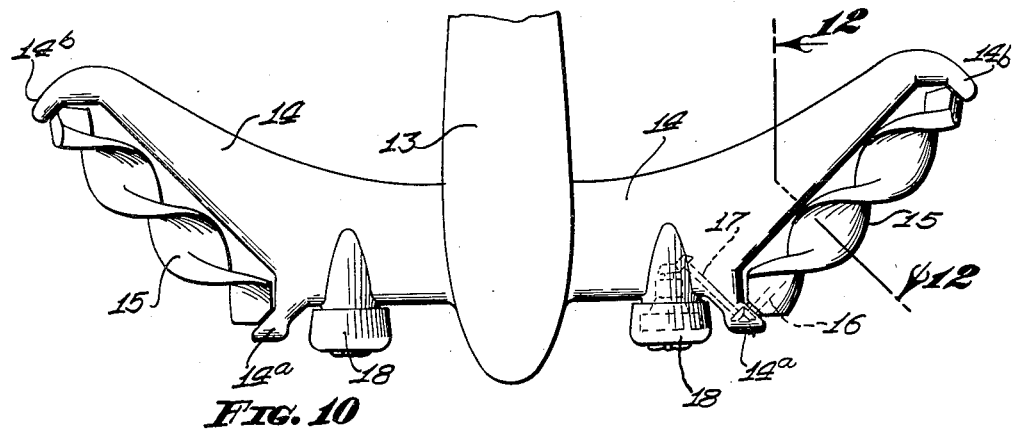
Figure 11:
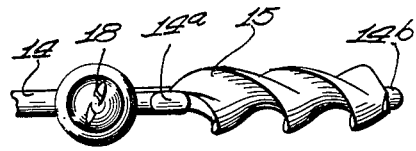
Figure 12:
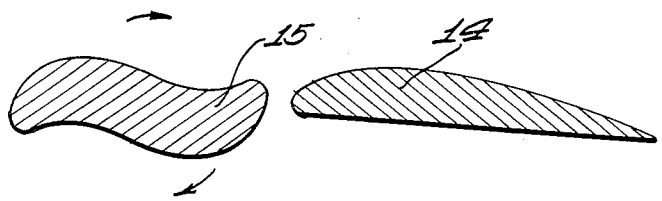

The structure illustrated in Figures 10, 11 and 12 inclusive pertains to a still different embodiment of my invention, particularly suited for commercial aircraft, in which the sustaining means are mechanically rotated instead of freely revoluble by action of the air stream; Fig. 10 is a fragmentary plan view of this embodiment of my invention; Fig. 11 is a fragmentary front elevational view thereof; and Fig. 12 is an enlarged diagrammatical sectional view through 12—12 of Fig. 10.

Similar characters of reference refer to similar parts and portions throughout the several views of the drawings.

Wings 1, body 2, shafts 3, wings 4, main supporting bearings 5, shafts 6, fuselage 7, uprights 8, main axle 9, rocker arms 10, equalizer lever 11, bridge 12, fuselage 13, bracket wings 14, rotating wing members 15, shafts 16, gear and shaft mechanisms 17, and power units 18, constitute the principal parts and portions of my novel aircraft as illustrated in its various forms.

In broad terms the form of the sustaining means as shown in the several embodiments of my invention consist of a helix having an S-shaped cross section in which the upper portions thereof curve forwardly into the wind or air stream so that the upper portion of the means rotates in the direction of the air stream.

In the embodiment of my invention shown in

Figs. 1 to 6 inclusive, each sustaining means or wing 1 is formed of a sheet of thin light material having an S-shaped cross section throughout its length and given a helical twist in such a manner that the edges, designated 1a, curve outwardly and forwardly from their upper position as shown best in Figs. 1, 2, and 3.

Each wing 1 is provided with a small channel 1b formed by depressing the material slightly as shown best in Figs. 3 and 6. This channel extends along the axis of said wing from the root thereof to a point approximately at the center of gravity thereof, as shown in Figs. 1, 2, and 6.

At the outer extremity of the channel 1b at approximately the center of the wing, there is provided a bracket bearing member 1c formed by cutting a small U-shaped slit in the wing and bending the material from the plane of the wing as shown best in Fig. 3. The bracket 1c forms a bearing.

Near the root of each wing, the channel is intersected by a transverse slit and a small section of the material is given a curvature opposite to that of the channel so that the margins of the slit form a bearing 1d.

The body or fuselage 2 may be in the form of a bird or may imitate the body of the fuselage of a conventional aircraft. In either case, the fuselage or body is provided with boss portions 2a which form supports for a shaft 3. As shown in Fig. 3, the shaft for both the wings 1 may be a single length of wire or a small hollow tube which extends through the body member so as to emerge from the bosses 2a. Such an arrangement is particularly suitable where the body is cast of light, thin material as the shaft may be cast in place as indicated at 3a.

Each projecting portion 3b of the shaft extends outwardly and upwardly so as to provide considerable dihedral angle for the purpose of insuring stability. The shaft portions 3b extend through the bearing portions 1d at the roots of the wings and to the bearing brackets 1c. At each bearing bracket 1c, the shaft 3 receives a pin 3c which extends through the bracket and is provided with a head 3d for retaining the wings in rotatable relation with the shaft.

Although the structure shown in Figs. 1 to 6 is elementary and more suited for a toy, it is obvious that the same fixed axis of rotation of the wings with respect to the body may be utilized in the construction of a commercial aircraft capable of carrying passengers or freight. However, with commercial aircraft the link arrangement illustrated in Figs. 7, 8, and 9 is particularly desirable.

In the structure shown in these views, the wing units 4 may still be S-shaped in cross section and arranged in a helical form. It is preferred to thicken the cross section of the wing so as to increase the lifting effect and reduce the drag, and thereby increase its efficiency. If a section of the wings illustrated in Figs. 7 and 8, were cut transversely through its center of rotation, the halves thus formed would resemble the leading portion of a conventional wing. This is particularly true of the camber of the convex surface designated 4a corresponding to the upper surface of a conventional airfoil. The camber of the concave surface, designated 4b, is preferably somewhat greater in magnitude than is common in connection with the conventional airfoil undersurface. This is for the purpose of aiding the rotation of the wing.

Each wing is provided with a bearing 5 located at approximately its center of gravity. Each bearing 5 journals a shaft 6 which extends through the root end of the wing.

The fuselage 7 of the aircraft is provided with a pair of uprights 8, which support a horizontally disposed main axle 9, arranged above the fuselage as shown best in Fig. 8.

A pair of rocker arms 10 are provided which are journaled intermediate their ends upon the axle 9 adjacent each upright 8. Each extended end of each rocker arm 10 is adapted to receive one of the shafts 6 which extends through a universally mounted bearing 10a provided in the end of the rocker arm. Each universal bearing 10a pivotally supports its shaft 6 so that the shaft is shiftable within limits in any direction about a point.

Mounted on the main axle 9 midway between the rocker arms 10 is an equalizer lever 11. The equalizer lever 11 is rotatably supported on the axle 9 independently of the rocker arms 10. Each end of the equalizer lever 11 is adapted to receive the inner ends of the pair of shafts 6 pivotally mounted by the corresponding ends of the two arms 10. The equalizer lever 11 is provided with suitable universal bearings 11a which support the ends of the shafts 6. Such an arrangement supports four shafts 6 in pairs and in tandem.

The rocker arms 10 are rigidly connected together by a bridge 12 which causes the rocker arms to move in unison.

The forwardly extending arms, designated 10b, of the rocker arms 10 are somewhat shorter than the rearwardly extending arms, designated 10c, while the arms, designated 11b and 11c, of the equalizer 11 are approximately equal in length. Thus the tandemly arranged sets of shafts 6 diverge as they extend outwardly from the fuselage.

The action of the wing connecting and equalizing mechanism illustrated is as follows:

The lifting action of the forward pair of wings tends to cause the connecting mechanism as a whole to rotate clockwise as viewed in Figs. 7 and 8 around the axis of the axle 9. However, the lifting action of the rearward pair of wings counteracts this rotation, thus the wings tend to reach positions of equilibrium which are independent of the angle of incident of the aircraft. Were the aircraft climbing, the connecting mechanism as a whole would be inclined forwardly and downwardly due to the action of the fuselage. Were the aircraft descending, the reverse action would obtain.

In addition to this bodily movement of the connecting mechanisms, there is movement of the wing shafts 6 with respect to the journals 10a and 10b of the rocker arms 10. Should the air stream strike the forward wings so as to cause them to increase their dihedral angles, the equalizer lever and rocker arms are shifted so as to decrease the dihedral angles of the rearward pair of wings. This flexibility of movement of the various wings enables the use of extremely light shafts 6 as well as other parts of the connecting mechanism due to the yieldable nature of the strains placed on the parts, particularly the shafts 6. This arrangement also enables the various wing sections to automatically assume a position of maximum lift.

The construction shown in Figs. 7 to 9 inclusive may be provided with the conventional control surfaces such as rudders and elevators.

The action of the equalizer mechanism eliminates the need of aileron control. However, if it is desired, a pair of wings may be provided at the lower side of the fuselage clear of the rotating wings, such wings being provided with suitable ailerons.

The structure shown in Figs. 7 to 9 inclusive may be propelled in the usual manner by a motor and propeller or may be in the form of a glider.

The structure shown in Figs. 10, 11, and 12, illustrates an arrangement which is primarily adapted for mechanically rotating the wings, rather than relying on the action of the air stream. Where the sustaining means or wings are operated by the action of the air stream, the wings may be arranged on pivotal axes approximately at right angles to the air stream, although a slight sweepback as well as sufficient dihedral is desirable. In the wings which are being driven by the action of the air stream, the movement of the upper portion of the wings is in the same direction as the air stream; hence the relative velocity is extremely low. Any relative air flow obtained is due solely to the frictional resistance of the wing to rotation. When, however, it is desired to rotate the wings mechanically, it is feasible to rotate the wings at a speed greater than air speed so that there is somewhat different action between the air stream and sustaining means.

In the structure illustrated in Figs. 10, 11, and 12, there is provided a fuselage 13 from which extend horizontally disposed bracket wings 14. The bracket wings may be provided with a conventional wing cross section so as to assist in sustaining the aircraft. The rear or trailing portion of each bracket wing 14 curves rearwardly as well as outwardly and the extremities of the bracket wings are provided with an extreme negative rake so that the extent of the wing along its extremities is considerably greater than the normal chord of the wing. Each wing is provided with an arm 14a and 14b at the forward and rear corners respectively of its outer extremity which extend at substantially right angles to the slope thereof. The arms 14a and 14b are adapted to journal the ends of rotatable wing members 15, similar in construction to the wing members provided and shown in Figs. 7, 8, and 9.

The wing members 15 are mounted upon shafts 16 which are connected by suitable gear and shaft mechanisms 17 to power units 18 which may be supported at the leading edge of the bracket wing 14 as shown in Figs. 10 and 11.

The wing members 15, as in the case of the previously described structures are mounted so that their upper portions rotate in the direction of the air stream. Hence these upper portions curve forwardly or are concave at their forward sides. Each wing member is arranged with respect to the air stream in such a manner that the portions of the helix on the under side of its axis is substantially tangential to the air stream as illustrated in Fig. 11. Such a position reduces the drag of the wing to a minimum as it is the under portion of the wing that is moving forwardly against the air stream which offers the most resistance.

By reason of the fact that each wing member is driven faster than the air stream, it tends to move forwardly in the air stream by imparting a rearward and outward thrust somewhat in the manner of a propeller, however, the slip stream of each wing member is somewhat slower than that of a true propeller, but is of greater cross-sectional area so that the efficiency is high. The forward propulsive action of the wing members 15 change their lifting action, so that they function both as a sustaining and a propulsion means.

The rotating wing members, being located forwardly of the bracket wings 14, produce in their rotation a beneficial action upon the lift of the bracket wing, as the tendency is to reduce the flow along the under side of the bracket wings and increase the flow along the upper side thereof.

The primary purpose of making the wings in a helical form is to cause the lifting action thereof to be constant for every angular position thereof. As the concave portions of the wing offer greater resistance than the convex portions thereof, the convex portions form the leading sides. Thus in the structures illustrated, the portions of the wings above their axes of rotation move in a direction of the air stream while the under sides thereof move against the air stream. The under side of each wing is rising as well as moving into the wind with its convex surface at the upper side, thus the lifting action of the air flowing across this surface is similar to the action created by the flow of air over a conventional airfoil or over a rotating cylinder in an air stream. However, the magnitude of the lift created by this action is materially greater than that obtained from the fixed airfoil sections, due partly to the fact that the velocity of the portion of the wing creating the lift with respect to the air stream is twice that of the velocity of the fuselage to which it is attached with respect to the same air stream.

Thus, for example, if the airplane as a whole was moving at fifty miles an hour, the lift of the wing because of the added relative movement with respect to the air is the same as if the wing were fixed and the airplane moving at a hundred miles an hour.

It will also be noted that regardless of the direction of the movement of the wing with respect to the horizontal, the resultant angle of attack is constant, thus overcoming the shifting of the center of pressure created by the conventional airfoil section upon changing the angle of attack. This is due to the fact that the center of pressure obtained at all times is the resultant of the various centers of pressure of all the possible angles of attack of the wing with respect to the air flow. Thus, regardless of the angle of incidents of the aircraft as a whole, the angle of attack or the center of pressure of the wing remains constant; hence, should the airplane be maneuvered into a stalling condition, the only effect is a lessening of the forward velocity which merely lessens the lift and causes the forward or raised end of the aircraft to drop thereby automatically bringing it out of a stall. If one attempts to maintain the aircraft in such a stalling position, the aircraft merely settles slowly as the efficiency of the lifting action continues.

Though I have shown and described a particular construction, combination and arrangement of parts and portions and certain modifications thereof, I do not wish to be limited to the construction, combination and arrangement nor to the modifications but desire to include in the scope of my invention, the construction, combination and arrangement substantially as set forth in the appended claims.

Having thus described my invention, what I claim as new and desire to secure by Letters Patent is:

1. In an aircraft, a sustaining means, including a pair of similarly shaped portions extending in diametrically opposite directions, each portion having the form of the leading section of a lift producing airfoil, said portions being twisted about their common axis forming a helix.

2. In an aircraft, a plurality of sustaining means, each having a substantially S-shaped cross section and twisted longitudinally to form a helix, the axis of said sustaining means being disposed transversely to the direction of flow of a medium in which it is immersed, said sustaining means arranged in oppositely extending pairs, one pair behind the other, and an equalizing mechanism including a shaft for each sustaining means revolubly supporting the same, a lever member pivotally supporting said shafts at their ends extending from said sustaining means, and frame means connected with said lever means and lever member at their axis of rotation, and a fuselage associated with said frame.

3. In an aircraft, a plurality of sustaining means, each including a pair of similarly shaped portions extending in diametrically opposed directions, each portion having substantially the form of the leading section of a lift producing airfoil, said portions being twisted about their common axis forming a helix, said sustaining means arranged in oppositely extending pairs, one pair behind the other, and an equalizing mechanism including a shaft for each sustaining means revolubly supporting the same, a lever member pivotally supporting said shafts at their ends extending from said sustaining means, and frame means connected with said lever means and lever member at their axis of rotation, and a fuselage associated with said frame.

4. In an aircraft, a plurality of revolubly mounted sustaining means each arranged in the form of a helix, the portion of said sustaining means above its axis being revoluble in the direction of flow of a medium in which it is immersed, said sustaining means arranged in oppositely extending pairs, one pair behind the other, and an equalizing mechanism including a shaft for each sustaining means revolubly supporting the same, a lever member pivotally supporting said shafts at their ends extending from said sustaining means, and frame means connected with said lever means and lever member at their axis of rotation, and a fuselage associated with said frame.

5. In an aircraft, a plurality of revoluble sustaining units arranged in tandemly disposed pairs, and an equalizing mechanism connecting said units whereby an increase in the dihedral of one pair of said sustaining units, causes a decrease in the dihedral angle of the other pair of said sustaining units.

6. In an aircraft, a plurality of revoluble sustaining units arranged in tandemly disposed pairs, and an equalizing mechanism connecting said units whereby an increase in the dihedral of one pair of said sustaining units, causes a decrease in the dihedral angle of the other pair of said sustaining units, each of said sustaining units disposed so that the air stream flows transversely therewith, the section of each sustaining unit being such that the upper portion thereof tends to revolve in a direction of air flow.

7. In an aircraft, a sustaining means, including a pair of similarly shaped portions extending in diametrically opposite directions, each portion having the form of the leading section of a lift producing airfoil, said portions being twisted about their common axis forming a helix, and engine means for driving said sustaining means.

8. In an aircraft, a body member, a plurality of sustaining means associated with said body member and arranged in oppositely extending pairs and in tandem, each of said sustaining means being so shaped that the portions thereof above its axis rotate with the air stream and the portions below said axis rotate into said air stream, and a connecting mechanism common to said sustaining means, said connecting mechanism arranged to cause a decrease in the dihedral angle of one pair of sustaining means upon an increase in dihedral of the other pair of sustaining means.

9. In an aircraft, a body member, a plurality of sustaining means associated with said body member and arranged in oppositely extending pairs and in tandem, each of said sustaining means being so shaped that the portions thereof above its axis rotate with the air stream and the portions below said axis rotate into said air stream, and a connecting mechanism common to said sustaining means, said connecting mechanism arranged to cause a decrease in the dihedral angle of one pair of sustaining means upon an increase in dihedral of the other pair of sustaining means, said connecting mechanism being rotatably connected with said body member whereby said sustaining means are revoluble as a unit with respect to said body member.

10. In an aircraft, a fuselage, a plurality of sustaining and propulsion members associated with said fuselage, each of said sustaining and propulsion members being S-shaped in cross section and in the form of a helix and disposed with its axis at an acute angle with respect to an air stream during forward movement of said fuselage, each of said sustaining and propulsion members having a cross section so shaped that the action of said air stream thereupon causes rotation of the portions above the axis of said sustaining and propulsion member with said air stream, and engine means carried by said aircraft for revolving said sustaining and propulsion members in the direction of the action of said air stream, the convolutions of said sustaining and propulsion members being such that the rotation thereof above the velocity of said air stream sets up a thrust rearwardly along their axes.

11. In an aircraft, a fuselage, a plurality of sustaining and propulsion members associated with said fuselage, each of said sustaining and propulsion members being in the form of a helix and being revoluble about a fixed axis, said axis so disposed with respect to an air stream striking said sustaining and propulsion members that the direction of the pitch of the convolutions of said helix below its axis is substantially parallel with the direction of flow of said air stream, each of said sustaining and propulsion members having a cross section so shaped that the action of said air stream thereupon causes rotation of the portions above the axis of said sustaining and propulsion member with said air stream, and engine means carried by said aircraft for revolving said sustaining and propulsion members in the direction of the action of said air stream, the convolutions of said sustaining and propulsion members being such that rotation thereof above the velocity of said air stream sets up a thrust rearwardly along their axes.

FRANK W. McINTYRE.